United States Patent
Kato et al.

(10) Patent No.: US 8,102,821 B2
(45) Date of Patent: Jan. 24, 2012

(54) PACKET SCHEDULING METHOD, BASE STATION, AND MOBILE STATION IN MOBILE COMMUNICATION SYSTEM

(75) Inventors: Yasuhiro Kato, Yokohama (JP); Masayuki Motegi, Yokohama (JP); Anil Umesh, Yokohama (JP); Takehiro Nakamura, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 575 days.

(21) Appl. No.: 12/296,854

(22) PCT Filed: Apr. 20, 2007

(86) PCT No.: PCT/JP2007/058651
§ 371 (c)(1),
(2), (4) Date: Oct. 24, 2008

(87) PCT Pub. No.: WO2007/123209
PCT Pub. Date: Nov. 1, 2007

(65) Prior Publication Data
US 2009/0274124 A1    Nov. 5, 2009

(30) Foreign Application Priority Data
Apr. 21, 2006 (JP) ................................. 2006-118160

(51) Int. Cl.
*H04J 3/00* (2006.01)
(52) U.S. Cl. ..................... 370/336; 370/338; 370/328
(58) Field of Classification Search ............... 370/336, 370/431
See application file for complete search history.

(56) References Cited

U.S. PATENT DOCUMENTS

| | | | | |
|---|---|---|---|---|
| 6,463,307 B1 * | 10/2002 | Larsson et al. | ................ | 455/574 |
| 2003/0117968 A1 * | 6/2003 | Motegi et al. | ................ | 370/311 |
| 2005/0135302 A1 * | 6/2005 | Wang et al. | ................ | 370/329 |
| 2005/0237984 A1 * | 10/2005 | Benveniste | ................ | 370/338 |

FOREIGN PATENT DOCUMENTS

| | | |
|---|---|---|
| JP | 08-251097 A | 9/1996 |
| JP | 2003-179539 A | 6/2003 |
| JP | 2004-289234 A | 10/2004 |
| JP | 2004-320153 A | 11/2004 |
| JP | 2006-501721 A | 1/2006 |
| WO | 00/10353 A1 | 2/2000 |

OTHER PUBLICATIONS

International Search Report w/translation from PCT/JP2007/058651 dated Jun. 26, 2007 (4 pages).

(Continued)

*Primary Examiner* — Ricky Ngo
*Assistant Examiner* — David Oveissi
(74) *Attorney, Agent, or Firm* — Osha • Liang LLP

(57) ABSTRACT

A downlink packet scheduling method is disclosed for a shared channel or a common channel in a mobile communication system between a base station and a mobile station, the method including a step in which the base station determines whether there is a waiting packet to be transmitted to the mobile station other than a current transmission packet; a step in which when it is determined that there is no waiting packet to be transmitted, the base station sets a stop period "t" in which packet transmission is temporarily stopped after the current packet transmission; a step in which the base station transmits information indicating the stop period "t" through a schedule information channel transmitting schedule information of downlink packets; and a step in which the base station stops the packet transmission to the mobile station during the stop period "t" after the current packet transmission.

5 Claims, 5 Drawing Sheets

OTHER PUBLICATIONS

Written Opinion from PCT/JP2007/058651 dated Jun. 26, 2007 (3 pages).

Office Action for Japanese Patent Application No. 2006-118160 mailed Feb. 22, 2011, with English translation thereof (3 pages).

* cited by examiner

PACKET SCHEDULING METHOD, BASE STATION, AND MOBILE STATION IN MOBILE COMMUNICATION SYSTEM

TECHNICAL FIELD

The present invention generally relates to a downlink packet scheduling method in a mobile communication system between a base station and a mobile station. More specifically, the present invention relates to a downlink packet scheduling method in a radio access system using a common channel or a shared channel, and a base station and a mobile station using the method.

BACKGROUND ART

In a conventional mobile communication system, a so-called circuit-switched radio channel for voice and TV-phone communication services and the like and a packet exchange radio channel for Internet connection service are separately provided. Because of this feature, when a voice service and an Internet connection service are being simultaneously provided, simultaneous control for setting both radio channels is being performed. One of the major reasons why the radio channels are separately provided for a circuit-switched call and a packet exchange call respectively is that the traffic characteristics occurring in services on one radio channel are largely different from those of the other. Because of this difference, by providing separate radio channels and optimizing a battery energy saving method, radio performance is desired to be improved.

However, recently and continuously, there is a demand for a so-called all-IP environment where even circuit-switched data such as voice data are divided into IP packets and transmitted as IP packets. This demand is particularly strong in wired networks. In all-IP transmission, basically, all data are divided into IP packets and a common transmission process is performed with respect to each of the IP packets. Because of this feature, a control process and implementation of the process may be easier compared with a circuit-switched system in which each of the currently transmitting service types is required to be recognized and an adequate transmission method adapted to the service is required to be selected. Further, there is a strong demand that various applications such as Web access or data transmission be provided at the same time as voice communication service. This demand also encourages the all-IP environment.

This demand is also growing in radio communication systems. In a latest method (trend), a shared channel which is a radio channel shared by all traffic is used to achieve the all-IP environment. In this method using the shared channel, it is not necessary to recognize an upper layer service in processes of generating radio frames and encoding and the like, thereby facilitating the implementation of this shared channel transmission method.

On the other hand, however, when techniques specific to mobile communications such as a battery energy saving technique are considered, performing control based on the recognition of the upper layer service may be preferable. Specifically, in voice communication, packet data are generated typically at regular intervals. Because of this feature, it is possible to previously fix receiving/transmitting timing. By doing this, it becomes possible to turn off a receiving circuit of a mobile station at the timing when the voice communication is not being performed. As a result, it becomes possible to perform an optimization process including easily saving battery power.

However, on the shared channel, when a common scheduling process is performed without recognizing service types of data to be processed, the mobile station has to be prepared to receive data in every data reception timings because the mobile station cannot predict when or in which traffic pattern data packets are being generated. As a result, even when only voice communication is being performed and the data are intermittently received, the mobile station has to be prepared to receive data at every receiving timing. As a result, this method is disadvantageous from a battery energy saving point of view, and a technique for overcoming the problem has been desired.

As prior-art documents pertaining to the present invention, there are the following Patent Documents 1 and 2.

Patent Document 1: Japanese Patent Application Publication No. 2004-289234

Patent Document 2: Japanese Patent Publication No. 2006-501721

DISCLOSURE OF INVENTION

Problems to be Solved by the Invention

The present invention is made in light of the problems and may provide a method capable of performing a battery energy saving function in accordance with the traffice characteristics of the service and different frequency measurement by devising a downlink packet scheduling method in a mobile communication system between a base station and a mobile station.

Means for Solving the Problems

According to an aspect of the present invention, there is provided a downlink packet scheduling method for a shared channel or a common channel in a mobile communication system between a base station and a mobile station. The method includes a step in which the base station determines whether there is a waiting packet to be transmitted to the mobile station other than a current transmission packet; a step in which when it is determined that there is no waiting packet to be transmitted, the base station sets a stop period "t" in which packet transmission is temporarily stopped after the current packet transmission; a step in which the base station transmits information indicating the stop period "t" through a schedule information channel transmitting schedule information of downlink packets; and a step in which the base station stops the packet transmission to the mobile station during the stop period "t" after the current packet transmission.

According to another aspect of the present invention, there is provided a base station establishing a radio communication channel of a mobile communication system with a mobile station and having a downlink scheduling function for a shared channel or a common channel. The base station includes a buffer in which a packet to be transmitted to the mobile station may be held; a scheduling section determining whether there is a waiting packet to be transmitted to the mobile station in the buffer other than a current transmission packet and, when it is determined that there is no waiting packet, sets a stop period "t" in which packet transmission to the mobile station is temporarily stopped after the current packet transmission and stops the packet transmission to the mobile station during the stop period "t"; and a radio transmitting section transmitting information indicating the stop period "t" through a schedule information channel transmitting schedule information of downlink packets.

According to still another aspect of the present invention, there is provided a mobile station establishing a radio communication channel with a base station having a downlink scheduling function for a shared channel or a common channel. The mobile station includes a radio receiving section receiving and demodulating a signal transmitted from the base station and outputting data; a stop signal detecting section detecting a temporary stop signal for the mobile station from the data and outputting a temporary stop period value; and a stop controlling section receiving the temporary stop period value and stopping a receiving operation of the radio receiving section for a period of the temporary stop period.

The stop period "t" may be set based on records of past transmission packet waiting status.

As the stop period "t", a prescribed upper limit value may be set, and an average value or a minimum value of time periods in which there is no waiting packet to be transmitted may be set.

Advantageous Effect of the Invention

According to a scheduling method according to an embodiment of the present invention, advantageously, while maintaining that it is not necessary to perform signaling control and status management related to starting/stopping of the service to be provided and also that it is not necessary to directly recognize the upper layer service, it becomes possible to stop scheduling based on the occurring status of the past packet traffic. Therefore, the mobile station may reduce battery power consumption and perform different frequency measurement while the scheduling is stopped.

EXPLANATION OF REFERENCES

100 MOBILE COMMUNICATION SYSTEM
101 MOBILE STATION
102 BASE STATION
201 SCHEDULING CONTROL CHANNEL
202 SHARED CHANNEL
404 BUFFER
406 RADIO TRANSMITTING SECTION
408 SCHEDULING SECTION
702 RADIO RECEIVING SECTION
704 STOP SIGNAL DETECTING SECTION
706 STOP CONTROLLING SECTION

BEST MODE FOR CARRYING OUT THE INVENTION

Figure 1:
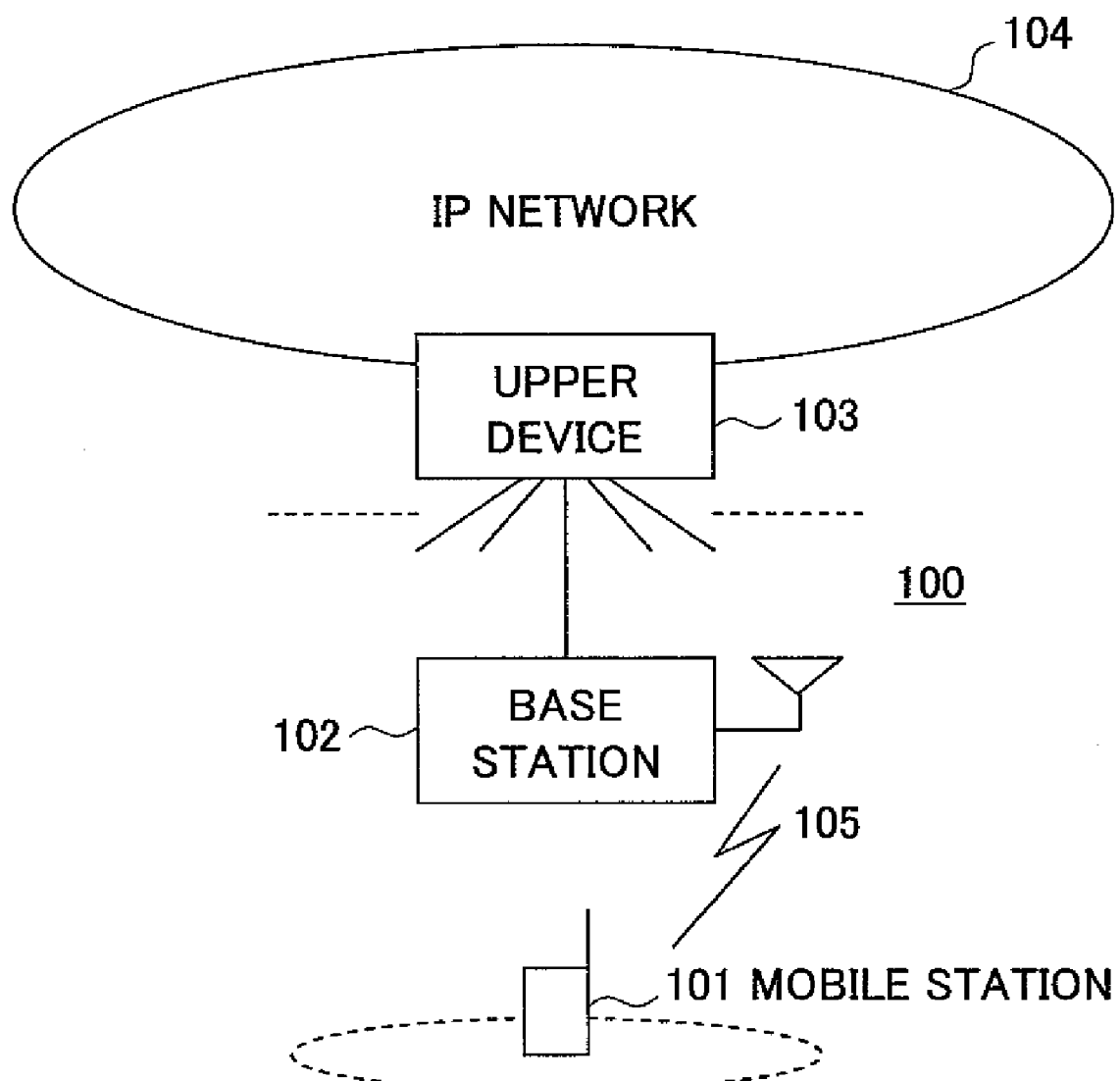
FIG. 1 is a conceptual diagram illustrating an exemplary configuration of a mobile communication system according to an embodiment of the present invention.

FIG. 1 shows an exemplary configuration of a mobile communication system 100 according to an embodiment of the present invention. In FIG. 1, there is only one mobile station 101. However, practically, there are plural mobile stations and radio communication channels are established between each of the mobile stations and a base station 102. The base station 102 transmits and receives packet data through the radio communication channels 105 that have been established between the base station 102 and the mobile station 101. The radio communication channels 105 include at least a shared channel shared among the plural mobile stations for transmitting and receiving packets and a scheduling control channel through which scheduling results such as assignment of the shared channel are transmitted (see FIG. 2). In this embodiment, the term "shared channel" is collectively used. However, it should be noted that, in a multicarrier transmission system, plural subcarriers may be included in the shared channel.

The base station 102 has a packet scheduling function for setting a schedule of the shared channel 202 based on records of past waiting status of the packet data to be transmitted to the mobile stations 101 and a function to temporarily stop the radio transmission to the mobile station 101.

The mobile station 101 transmits and receives packet data through the radio communication channel 105 established between the mobile station 101 and the base station 102. The mobile station 101 receives data through the shared channel in accordance with the information transmitted through the scheduling control channel. When a period in which radio transmission to the mobile station 101 is specified in the information transmitted through the scheduling control channel, the mobile station may stop receiving data through both the scheduling control channel and the shared channel.

Figure 2:
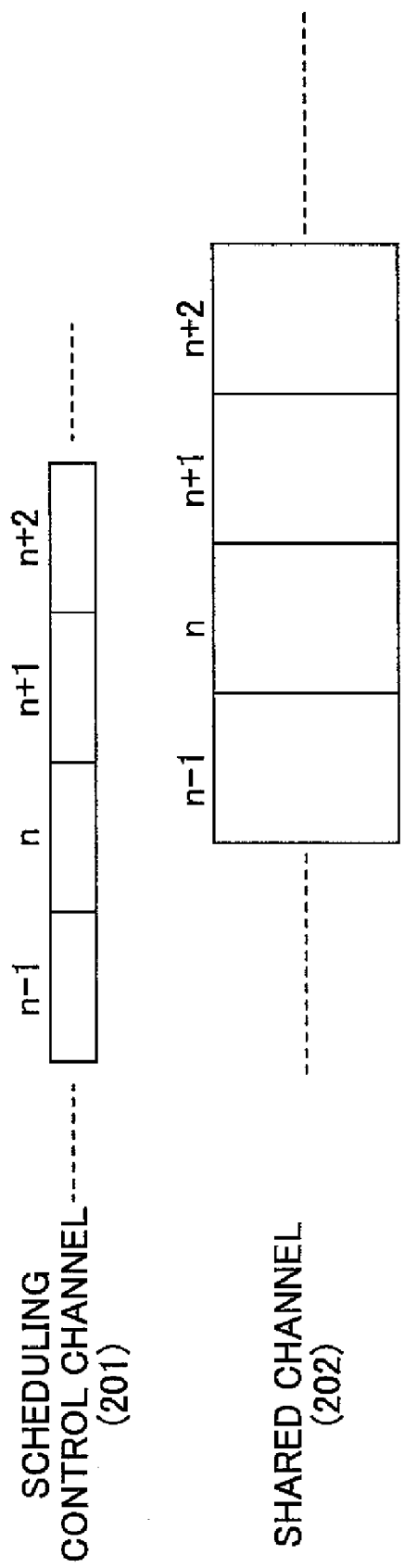
FIG. 2 is a drawing showing exemplary configurations of a scheduling control channel and a downlink shared channel.

FIG. 2 shows an exemplary configuration of the scheduling control channel 201 and the downlink shared channel 202 according to an embodiment of the present invention. The shared channel (n−1, n−n+1, n+2, . . . ) 202 through which packet data are transmitted corresponds to the scheduling control channel (n−1, n−n+1, n+2, . . . ) 201.

Upon receiving data through the scheduling control channel 201, the mobile station 101 may recognize the scheduling results set by the base station 102. When the mobile station 101 is specified so that no data are to be transmitted to the mobile station 101, the mobile station 101 stops receiving data through both the scheduling control channel and the shared channel for a stop period specified in data transmitted through the scheduling control channel.

In this embodiment, both channels 201 and 202 are provided as separate channels. However, the embodiments of the present invention are not limited to this configuration. For example, those channels may be combined into a single channel in which the functions of the scheduling control channel are included. Hereinafter, such a channel including the function of the scheduling control channel is also called the scheduling control channel.

Figure 3:
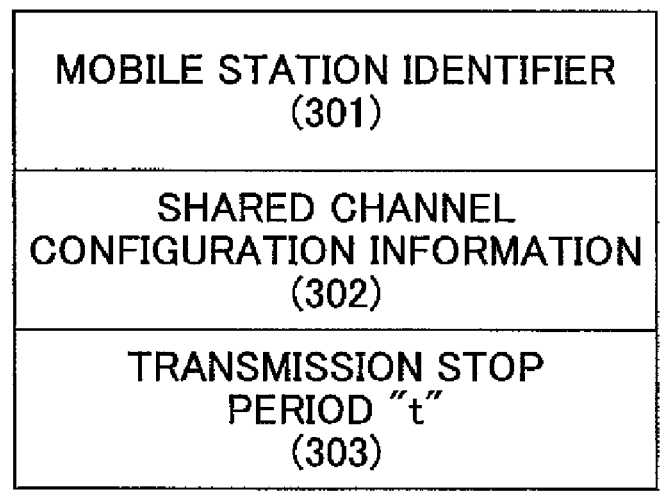
FIG. 3 is drawing showing an exemplary configuration of schedule information transmitted through the scheduling control channel according to an embodiment of the present invention.

FIG. 3 shows an exemplary configuration of schedule information transmitted through the scheduling control channel according to an embodiment of the present invention. The schedule information mainly includes a mobile station identifier 301, shared channel configuration information 302, and transmission stop period "t" 303. The mobile station identifier 301 identifies the mobile station 101 as a scheduling target. The shared channel configuration information 302 includes a modulating method for receiving data through the corresponding shared channel. The transmission stop period 303 refers to a time interval in which, after the transmission of this packet, the packet currently being transmitted, or the packet to be transmitted, the packet radio transmission to the mobile station specified by the mobile station identifier 301 is temporarily stopped.

Figure 4:
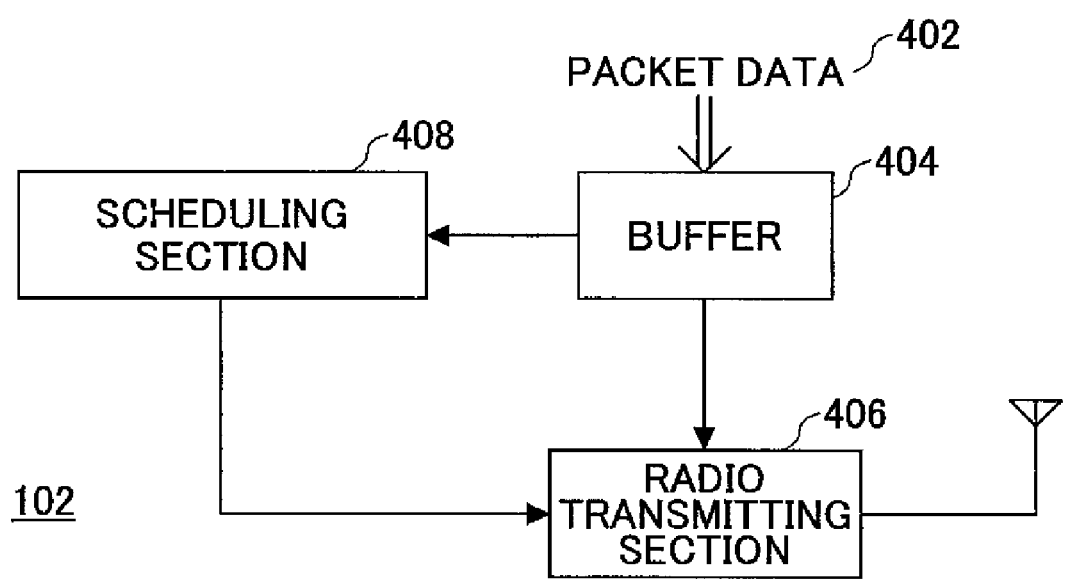
FIG. 4 is a schematic drawing showing an exemplary configuration of a base station according to an embodiment of the present invention.

FIG. 4 shows an exemplary configuration of a base station according an embodiment of the present invention. By adaptively setting the transmission stop period "t" by the base station 102, the mobile station 101 may secure time to save battery power and perform different frequency measurement. The scheduling section 408 of the base station 102 determines whether there is a following packet to be transmitted to the mobile station 101 in a buffer 404 of the base station 102. When determined that there is a following packet to be transmitted to the mobile station 101 in the buffer 404, the radio transmitting section 406 continues the packet transmission to the mobile station 101*r* and the mobile station continues to receive the packets. In such a case, the scheduling section 408 does not set a value for the transmission stop period "t".

On the other hand, when determining that there is no following packet to be transmitted to the mobile station 101 in the buffer 404, the scheduling section 408 sets an appropriate value for the transmission stop period "t".

Figure 5:
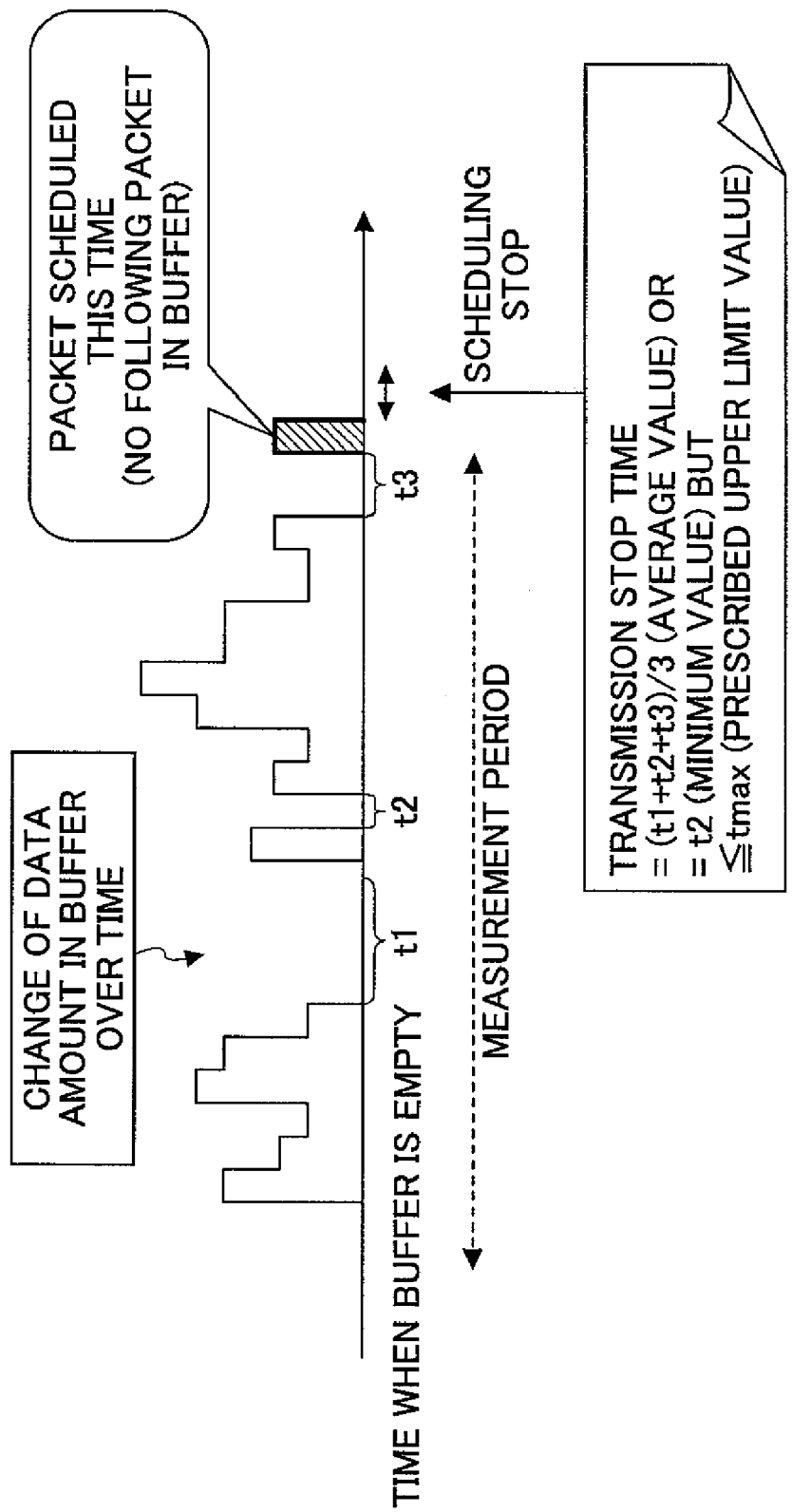
FIG. 5 is a schematic graph showing a method of calculating a transmission stop period "t" according to an embodiment of the present invention.

FIG. 5 is a schematic graph showing a method of calculating the transmission stop period "t" according to an embodiment of the present invention. In FIG. 5, the horizontal axis denotes time, and the vertical axis denotes a remaining amount of packet data in the buffer 404 to be transmitted to the mobile station 101. In a prescribed past time span (measurement period), an average value or a minimum value of the time intervals $t_1$, $t_2$, and $t_3$ is obtained to be set as the transmission stop period "t". That is, the transmission stop period "t" is given as follows:

$$t=(t_1+t_2+t_3+\ldots+t_n)/n$$

or $$t=\min[t_1+t_2+t_3+\ldots+t_n]$$

Further, the transmission stop period "t" may be calculated by considering both of the average value and the minimum value. Further, the transmission stop period "t" may be set by using an intermediate value or a most frequently observed value of the values $t_1$, $t_2$, and $t_3$.

However, an upper limit value $t_{max}$ should be set to avoid the degradation of the response speed due to the stopping of packet radio transmission for a long period by fulfilling the following relationship.

$$t \leq t_{max}$$

When the minimum value is used as the transmission stop period "t", the transmission stop period becomes relatively short. As a result, the power-saving effect on the battery may be reduced, but the delay time of a packet may be reduced when the packet is generated in the transmission stop period.

On the other hand, when the average value is used as the transmission stop period "t", the transmission stop period becomes relatively long. As a result, the delay time of a packet may be increased when the packet is generated in the transmission stop period, but the power-saving effect on the battery may be increased.

The minimum value, the average value, or the other value may be previously selected by considering the power-saving effect on the battery and the delay time.

Figure 6:
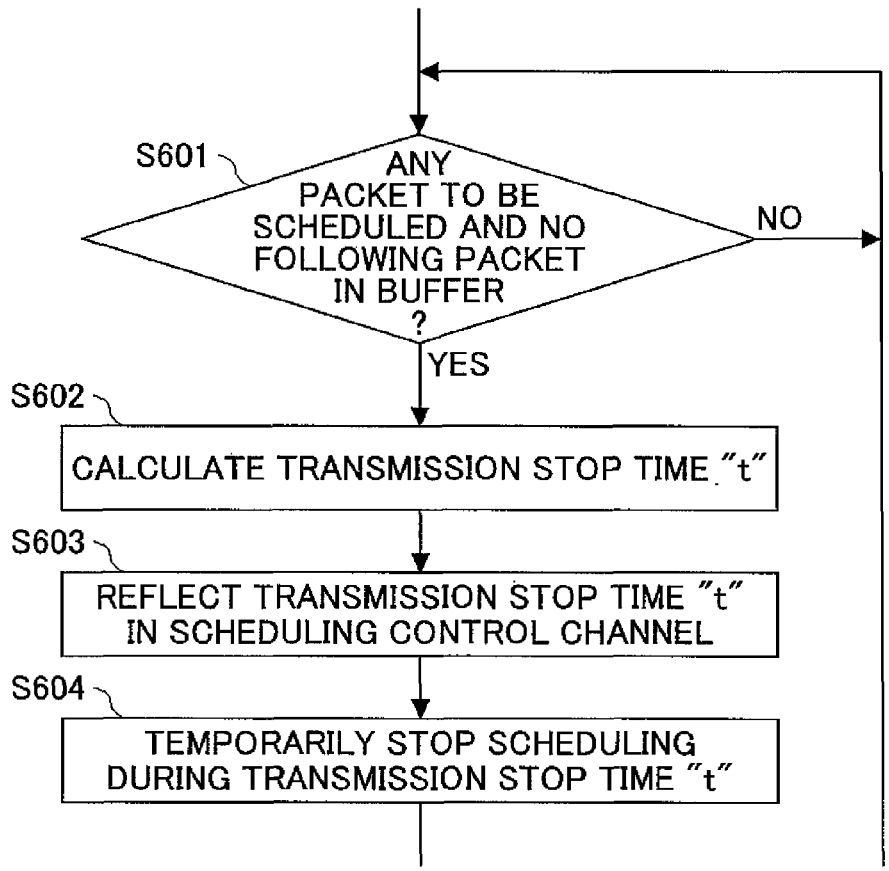
FIG. 6 is a flowchart showing an operation performed at every scheduling timing according to an embodiment of the present invention.

FIG. 6 is a flowchart showing an operation performed at each scheduling timing of the base station 102 according to an embodiment of the present invention. The scheduling section 408 (see also FIG. 4) of the base station 102 determines whether there are packet data to be scheduled in the buffer 404 and whether there are following packet data in the buffer 404 to be transmitted to the mobile station 101 (step S601). Only when it is determined that there are packet data to be scheduled and there are no following packet data in the buffer 404 to be transmitted to the mobile station 101 (YES in step S601), the process goes to step S602, where a value of the transmission stop period "t" is calculated. On the other hand, when it is determined that there are no packet data to be scheduled or that there are the following packet data in the buffer 404 to be transmitted to the mobile station 101 (NO is step S601), the process returns to step S601.

In step S602, the scheduling section 408 calculates the value of the transmission stop period "t" according to a method described above. In step S603, the scheduling section 408 reflects the calculated value of the transmission stop period "t" in an information element of the scheduling control channel and informs the mobile station 101 of the value "t" through the radio transmitting section 406. As a result, a schedule is set so that no data are to be transmitted to the mobile station 101 in a period "t" after the transmission of the current packet data (hereinafter in this description may be referred to as "temporary stop of scheduling to mobile stations").

Figure 7:
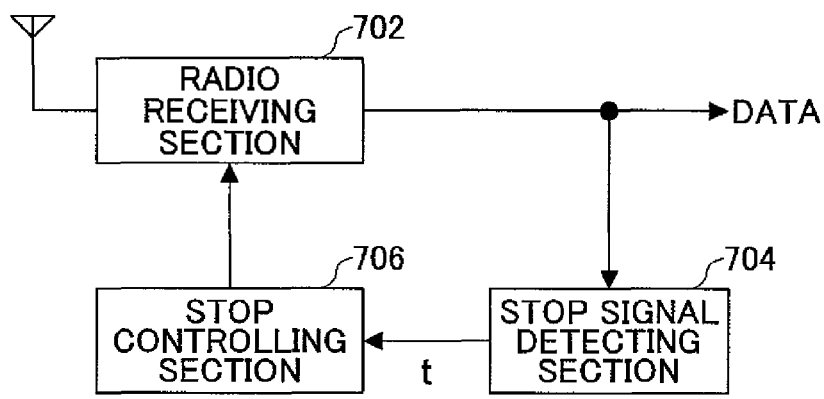
FIG. 7 is a schematic drawing showing an exemplary configuration of a mobile station according to an embodiment of the present invention.

FIG. 7 shows an exemplary configuration of the mobile station 101 according to an embodiment of the present invention. The radio receiving section 702 receives a radio signal from the base station 102, demodulates and performs channel separation of the received signal, and outputs various data. From the data output from the radio receiving section 702, the stop signal detecting section 704 detects the transmission stop period "t" from the base station 102. The detected transmission stop period "t" is transmitted to the stop controlling section 706. During the transmission stop period "t", it is assured that no packet data are transmitted to the mobile station 101. Therefore, the stop controlling section 706 stops the receiving operation of the radio receiving section 702. By doing this, the mobile station 101 may turn off the receiving circuit so as to save battery power and perform the different frequency measurement when necessary.

By performing the operations described above, while maintaining that it is not necessary to perform signaling control and status management related to starting/stopping of the service to be provided because it is not necessary to explicitly recognize the upper layer service in radio channels, it becomes possible to stop scheduling based on the occurring status of the past packet traffic. Therefore, indirectly, it becomes possible to reduce battery power consumption and measure different frequencies in view of the traffic characteristics of the service.

In typical examples, when only a voice service is being used, a value of the transmission stop period "t" approaches a value of an interval between generation of voices. As a result, battery power consumption may be reduced during the transmission stop period "t". Further, while a voice service is being used, when a file having a capacity large enough compared with the radio transmission rate is being transferred, waiting packet data to be transferred may be held in the buffer for a longer period. In such a case, no operation to temporarily stop the scheduling is performed. As a result, the maximum throughput may be advantageously achieved. However, according to the embodiment of the present invention, as described above, the transmission stop period "t" is determined based on the past record of the buffered packet data. Because of this feature, new packet data may be generated just after the beginning of the transmission stop period "t". In such a case, the packet transmission resumes after the completion of the transmission stop period "t", which results in an increase of the delay. To overcome such a drawback, it is necessary to previously set the upper limit value with respect to the transmission stop period "t".

INDUSTRIAL APPLICABILITY

A scheduling method according to an embodiment of the present invention may be used in a mobile communication system.

The present international application claims priority from Japanese Patent Application No. 2006-118160 filed on Apr. 21, 2006, the entire contents of which are hereby incorporated herein by reference.

The invention claimed is:

1. A downlink packet scheduling method for a shared channel or a common channel in a mobile communication system between a base station and a mobile station, the method comprising:
   a step wherein the base station determines whether there is a waiting packet to be transmitted to the mobile station other than a current transmission packet;
   a step wherein when it is determined that there is no waiting packet to be transmitted, the base station sets a stop period "t" in which packet transmission is temporarily stopped after the current packet transmission;
   a step wherein the base station transmits information indicating the stop period "t" through a schedule information channel transmitting schedule information of a downlink packet; and
   a step wherein the base station stops the packet transmission to the mobile station during the stop period "t" after the current packet transmission,
   wherein the stop period "t" is set based on records of past transmission packet waiting status, and
   wherein as the stop period "t", a prescribed upper limit value is set, and an average value or a minimum value of time periods in which there is no waiting packet to be transmitted is set.

2. A base station establishing a radio communication channel of a mobile communication system with a mobile station and having a downlink scheduling function for a shared channel or a common channel, the base station comprising:
   a buffer in which a packet to be transmitted to the mobile station may be held;
   a scheduling section determining whether there is a waiting packet to be transmitted to the mobile station in the buffer other than a current transmission packet and, when it is determined that there is no waiting packet, sets a stop period "t" in which packet transmission to the mobile station is temporarily stopped after the current packet transmission and stops the packet transmission to the mobile station during the stop period "t"; and
   a radio transmitting section transmitting information indicating the stop period "t" through a schedule information channel transmitting schedule information of a downlink packet,
   wherein the stop period "t" is set based on records of past transmission packet waiting status, and
   wherein as the stop period "t", a prescribed upper limit value is set, and an average value or a minimum value of time periods in which there is no waiting packet to be transmitted is set.

3. The base station according to claim 2, wherein the stop period "t" is set based on records of past transmission packet waiting status.

4. The base station according to claim 3, wherein as the stop period "t", a prescribed upper limit value is set, and an average value or a minimum value of time periods in which there is no waiting packet to be transmitted is set.

5. The base station according to claim 2, wherein, the mobile station comprises:
   a radio receiving section receiving and demodulating a signal transmitted from the base station and outputting data;
   a stop signal detecting section detecting a temporary stop signal for the mobile station from the data and outputting a temporary stop period value; and
   a stop controlling section receiving the temporary stop period value and stopping a receiving operation of the radio receiving section for a period of the temporary stop period.

* * * * *